(12) United States Patent
Jäger et al.

(10) Patent No.: US 9,961,539 B2
(45) Date of Patent: May 1, 2018

(54) METHOD FOR SECURING TELECOMMUNICATIONS TRAFFIC DATA

(71) Applicant: UNISCON UNIVERSAL IDENTITY CONTROL GMBH, München (DE)

(72) Inventors: Hubert Jäger, Pullach (DE); Arnold Monitzer, Pullach (DE); Vesko Mitkov Georgiev, Unterföhring (DE); Christos Karatzas, München (DE); Jaymin Modi, München (DE); Dau Khiem Nguyen, München (DE); Dieter Spillmann, München (DE)

(73) Assignee: UNISCON UNIVERSAL IDENTITY CONTROL GMBH, München (DE)

( * ) Notice: Subject to any disclaimer, the term of this patent is extended or adjusted under 35 U.S.C. 154(b) by 205 days.

(21) Appl. No.: 14/959,374

(22) Filed: Dec. 4, 2015

(65) Prior Publication Data

US 2016/0255498 A1 Sep. 1, 2016

Related U.S. Application Data

(63) Continuation of application No. PCT/EP2014/061569, filed on Jun. 4, 2014.

(30) Foreign Application Priority Data

Jun. 4, 2013 (DE) .................. 10 2013 105 740

(51) Int. Cl.
*H04W 12/02* (2009.01)
*H04W 12/08* (2009.01)
(Continued)

(52) U.S. Cl.
CPC ......... *H04W 12/02* (2013.01); *H04L 63/0414* (2013.01); *H04W 12/08* (2013.01); *H04L 9/008* (2013.01); *H04L 63/0407* (2013.01)

(58) Field of Classification Search
None
See application file for complete search history.

(56) References Cited

U.S. PATENT DOCUMENTS

2003/0028602 A1 * 2/2003 Bhattacharya .......... H04M 3/53
709/206
2005/0076089 A1 * 4/2005 Fonseca .............. H04L 12/1859
709/206
(Continued)

FOREIGN PATENT DOCUMENTS

EP 2523 421 A1 11/2012
WO WO 2011063825 A1 * 6/2011 ........... H04L 67/322

OTHER PUBLICATIONS

International Search Report, dated Sep. 4, 2014, with Written Opinion for corresponding International Application No. PCT/EP2014/061569.

*Primary Examiner* — Saleh Najjar
*Assistant Examiner* — Louis Teng
(74) *Attorney, Agent, or Firm* — Myers Wolin, LLC

(57) ABSTRACT

A method is provided for securing telecommunications traffic data that are incurred with the telecommunications service provider of the telecommunications service when at least one telecommunications service is used by a number of subscribers is provided, wherein the telecommunications service is performed in a secure environment, the telecommunications service receives a message from at least one first subscriber of the telecommunications service, the message being intended for at least one second subscriber of the telecommunications service, and the telecommunications service, in response to the receipt of the message, sends a notification to the at least one second subscriber, wherein between the receipt of the message and the sending of the notification, a predetermined time delay is provided. Further, a system is provided for securing telecommunications traffic (Continued)

data is provided being adapted to execute the method according to the invention.

14 Claims, 2 Drawing Sheets

(51) Int. Cl.
*H04L 29/06* (2006.01)
*H04L 9/00* (2006.01)

(56) References Cited

U.S. PATENT DOCUMENTS

| | | | |
|---|---|---|---|
| 2005/0096059 A1* | 5/2005 | Jiang ................... | H04W 48/08 455/450 |
| 2006/0023727 A1* | 2/2006 | George .............. | H04L 63/0407 370/400 |
| 2006/0194571 A1* | 8/2006 | Bossemeyer, Jr. .... | H04M 3/537 455/412.2 |
| 2009/0234845 A1* | 9/2009 | DeSantis .............. | H04L 43/026 |

\* cited by examiner

METHOD FOR SECURING TELECOMMUNICATIONS TRAFFIC DATA

CROSS REFERENCE TO RELATED APPLICATIONS

This application is a continuation of International Application No. PCT/EP2014/061569, filed Jun. 4, 2014, which claims priority to German Application No. 10 2013 105 740.3, filed Jun. 4, 2013, the contents of each of which are incorporated by reference herein.

TECHNICAL FIELD

The invention relates to a system and a method for securing telecommunications traffic data, which is incurred during the use of a telecommunications service by a number of subscribers of the telecommunications service at the telecommunications service provider of the telecommunications service.

BACKGROUND

In some countries, for example, the Federal Republic of Germany, for data retention, personal data or individual-related data are stored by or for all locations, without the data currently being required. The purpose of such data retention is an improved prevention and prosecution of criminal offences. For this, the data has to be stored over a certain period of time, so as to be available, for example, for purposes of criminal prosecution. Usually, the data retention is performed by the service provider or service company of a telecommunications service.

In order to ensure that the provider of a telecommunications service has no unauthorized access to the traffic data of its customers, in order to, for example, generate personality profiles, it is known to store the connection data in a secured environment and to encrypt it prior to storage. The secured environment is also referred to as sealed infrastructure. The secured environment or the sealed infrastructure prevents this data to be accessed by neither one of the provider of the infrastructure nor the telecommunications service provider offering the telecommunications service, or other third parties. Further, it is known to encrypt the telecommunications data or connection data by means of two different encryption keys, wherein either one of the two keys is deposited with a trustworthy authority, for example, a notary. Thereby, an unauthorized access to the connection or traffic data is prevented efficiently, because in any case, the key deposited with the trustworthy authority is necessary for the access.

In order to also prevent data exchanged between the subscribers of telecommunications service, for example, electronic messages or electronic documents, from unauthorized access of the telecommunications service provider or other third parties, it is known to encrypt the data received from a subscriber such that only those subscribers may access the data, for which this data is intended. Both, the encrypting as well as the decrypting keys may be stored in the secured environment mentioned above. Thereby, it is ensured that neither the telecommunications service provider nor other third parties neither have access to the traffic data nor to the user data. An unauthorized evaluation of, for example, the traffic data within the scope of a grid investigation, thereby, is efficiently prevented, as far as, for example, no judicial order exists, which permits the use of the key deposited with a trustworthy authority, for example, a notary.

This method known from prior art for securing traffic data and user data, however, has the disadvantage that, even if the subscribers of a telecommunications service exchange data via a safe, for example, encrypted communications connection, the telecommunications service provider on the basis of the data traffic, is able to deduce information on who communicates with whom. The communications service provider may obtain this information even if the communication between the subscribers and the telecommunications service has been carried out encrypted, because for this information on who communicates with whom, the content of the data exchanged between the subscribers is not required.

This problem, in particular, arises if a telecommunications service, after the receipt of a message, for example, an electronic document, from a subscriber, signalizes to the subscriber, for whom the message is intended, by means of a further message, the presence of a message intended for him. Since the data exchange between the subscribers and the telecommunications service itself always is "visible" for the telecommunications service provider, the telecommunications service provider may obtain from the fact that a message has been deposited by a subscriber for a certain subscriber, and the subscriber, to whom the message is intended has been signalized on the presence of the message, the information that the two subscribers communicate with each other, even if the data exchange itself is performed encrypted, and if the subscriber, for whom the message was intended, does not request the latter from the telecommunications service.

Since also the information, who communicates with whom is rated as telecommunications traffic data, which can be used for a grid investigation or for the generation of personality profiles, the methods for data retention known from prior art although meeting high security standards, are not sufficiently protected or secured, in order to efficiently prevent the possibility of an unauthorized evaluation of telecommunications traffic data.

SUMMARY

Therefore, it is an object of the invention, to provide a system and a method for securing telecommunications traffic data, which occur at the telecommunications service provider of the telecommunications service during use of at least one telecommunications service by a number of subscribers, which effectively and efficiently prevent an unauthorized access or misuse of data of the telecommunications traffic data.

This object is solved according to the invention by a method and a system for securing telecommunications traffic data according to the independent claims. Preferred embodiments and further developments of the invention are specified in the respective dependent claims.

Accordingly, a method for securing telecommunications traffic data is provided, which is incurred during the use of a telecommunications service by a number of subscribers of the telecommunications service with the telecommunications service provider of the telecommunications service, wherein the telecommunications service receives a message of at least a first subscriber of the telecommunications service, which is intended for at least a second subscriber of the telecommunications service, and wherein the telecommunications service, in response to the receipt of the message, sends a notification to the at least one second subscriber, wherein between the receipt of the message and the sending of the notification, a certain time delay is provided.

It is preferable, if the telecommunications service is being executed in a secured environment (sealed infrastructure).

Since the telecommunications service is being executed in a secured environment or sealed infrastructure, it is ensured that the telecommunications service provider of the telecommunications service has no access to the incoming data at the telecommunications service. In order to not enable information being deduced from the data traffic between subscribers and the telecommunications service provider, from which it may be determined who communicates with whom, the time delay between the receipt of a message and the sending of the notification is provided. Thereby, it is prevented that it may be determined on the basis of a temporal correlation between the receipt of a message and the sending of a notification, who communicates with whom. Due to the time delay, it is prevented that a notification may be assigned to a received message such that also the sender of a message cannot be assigned to the recipient of the notification.

It is preferable, if the time delay between the receipt of the message and the sending of the notification is selected depending on the data traffic per time unit between the subscribers of the telecommunications service and the telecommunications service. Thereby, the time delay or the sending of the notifications may be adapted to the capacity of the telecommunications service preferably dynamically.

It has been found to be specifically advantageous, if the time delay is smaller for high data traffic per time unit than for low data traffic per time unit.

Because with high data traffic per time unit usually messages are received by the telecommunications service from a large number of subscribers, and thereby also notifications are sent to a large number of subscribers, the time delay may be reduced without offering the possibility to the telecommunications service provider to deduce information on who communicates with whom on the basis of a temporal correlation between the receipt of the messages and the sending of the notifications. With low data traffic per time unit, the telecommunications service usually only receives messages from a low number of subscribers, and, therefore, also has to send corresponding notifications to a low number of subscribers only. In order to also prevent a temporal correlation between the receipt of the messages and the sending of the notifications, the time delay is increased correspondingly.

According to an embodiment of the invention, the time delay is selected randomly from a time delay interval. The time delay may be selected randomly from a time delay interval for a predetermined number of notifications to be sent. Alternatively, the time delay may also be selected for each notification to be sent randomly from a time delay interval.

This has the advantage that by means of a temporal analysis of the incoming and outgoing data traffic, a determination of the current time delay is prevented efficiently, which would otherwise enable the telecommunications service provider with knowledge of the current time delay to create a temporal correlation between the received messages and the notifications sent, from which the telecommunications service provider could deduce information on who communicates with whom. The interval boundaries may be predetermined fixedly.

However, it is preferred, if the interval boundaries of the time delay interval are selected depending on the data traffic per time unit between the subscribers and the telecommunications service. Thereby, not only the time delay is selected randomly from the time delay interval, but rather also the time delay interval is being adapted to the data traffic such that the determination of the current time delay is even further impeded for the telecommunications service provider or an unauthorized third party.

The time delay ($\delta t$) may only be selected respectively for a predetermined number of notifications or for each notification differently.

According to a preferred embodiment of the invention, the data traffic per time unit comprises the number of received notifications per time unit. Thereby, it is prevented that with a low number of received messages per time unit, which, for example, cause high data traffic due to very large messages, the time delay is selected low, which would enable a temporal correlation between the received messages and the notifications sent due to the low number of received messages and notifications sent.

According to an embodiment of the invention, the telecommunications service may comprise a notification service, which generates the notification to the at least one second subscriber, and triggers the time-delayed sending of the generated notification, wherein the time delay is determined by the notification service.

According to an embodiment of the invention, the notification is sent to the at least one second subscriber, if the second subscriber is signed in at the telecommunications service. It may also be provided for no notification being sent to the second subscriber, if the subscriber is not signed in with the telecommunications service. It may be provided for also sending no notification to the second subscriber, after this second subscriber has signed in with the telecommunications service. Thereby, an even better de-correlation is achieved, i.e., the assignment of a notification to a received message may be impeded even further.

The notification may comprise data, which is adapted to output to the second subscriber, an acoustical and/or visual signal, which signalizes the presence of the message at the telecommunications service.

The notification of each subscriber may be identical. According to an embodiment of the invention, the notification may be sent decrypted, because no personal data may be deduced from the notification at all. The decrypted sending of the notification, moreover, has the advantage that no encrypting has to be carried out on the telecommunications service side, which otherwise would mean additional computational cost. The telecommunications service or the notification service, which generates the notification and sends it time-delayed, may be executed in a substantially more performant manner and resource efficient manner.

According to an embodiment of the invention, the message may be transmitted by the telecommunications service to the second subscriber upon request from the second subscriber. Since the notification is sent time-delayed with respect to the receipt of the message from the first subscriber to the second subscriber, no information may be deduced on the basis of the request to transmit the message to the second subscriber by the second subscriber that the first subscriber communicates with the second subscriber.

Moreover, the method according to the invention has the advantage that the causality between the incoming messages and the notifications to be sent is reversed, making a deduction of the information on who communicates with whom impossible.

The transmission of the message from the first subscriber to the second subscriber (via the telecommunications service) may be carried out on the basis of an end-to-end-encryption, i.e., the message is encrypted by the first subscriber and is decrypted by the second subscriber.

The message may be encrypted in a homomorphic manner.

Further, a system for securing telecommunications traffic data, which is incurred at the telecommunications service provider of at least one telecommunications service during the use of the telecommunications service by a number of subscribers is provided by the invention, wherein the telecommunications service is adapted to receive a message, which is intended for a second subscriber, by at least one first subscriber, and in response to the receipt of the message, to send a notification to the at least one second subscriber, wherein between the receipt of the message and the sending of the notification, a predetermined time delay is provided.

It has been found to be advantageous, if the system comprises a secured environment, in which the telecommunications service is executable.

The telecommunications service may be adapted to select the time delay between the receipt of the message and the sending of the notification depending on the data traffic per time unit between the subscribers and the telecommunications service.

The telecommunications service may comprise a notification service, which is adapted to generate the notification to the at least one second subscriber, and to trigger the time-delayed sending of the notification, wherein the time delay is determined by the notification service.

Moreover, the system according to the invention may be further adapted to execute a method according to the invention.

BRIEF DESCRIPTION OF THE DRAWINGS

Details and features of the invention as well as concrete embodiments of the invention can be derived from the following description in connection with the drawing, in which.

DETAILED DESCRIPTION

By means of the system according to the invention and the method according to the invention, adequate data protection as well as also sufficient possibilities for data evaluation, for example, for investigation purposes are enabled. Misuse of the stored data, in particular, of the telecommunications traffic data is efficiently prevented, wherein specifically no information on who communicates with whom can be deduced specifically from the data traffic.

Figure 1:
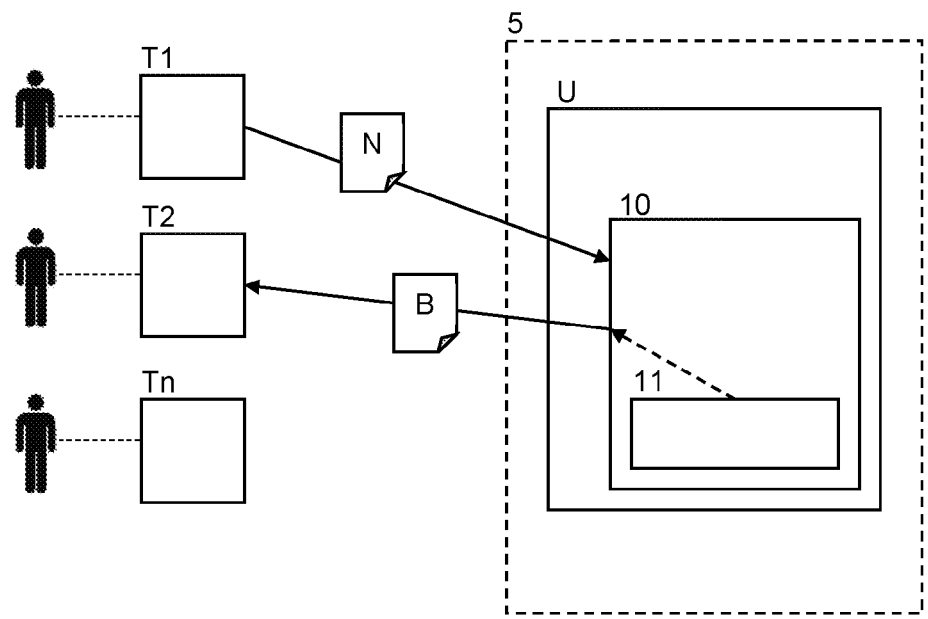
FIG. 1 shows a system according to the invention for securing telecommunications traffic data for explaining the method for securing the telecommunications traffic data according to the invention.

FIG. 1 shows a system for securing telecommunications traffic data according to the invention, which is incurred during use of a telecommunications service 10 by a number of subscribers T1 to Tn.

A telecommunications service provider 5 provides a telecommunications service 10, which is executed in a secured environment U. For example, a message box may be provided by the telecommunications service 10, in which subscribers admitted to the message box may leave messages for other subscribers. A message may, for example, be generated directly in the message box, or may be deposited via a communications network in the message box. A message, here, may be an electronic document or the like.

In the example shown in FIG. 1, a message N, for example, an electronic document is transmitted from a first subscriber T1 to the telecommunications service 10, and is deposited there, for example, in a corresponding message box. After receipt of the message N, the telecommunications service 10 generates a notification B in the secured environment U, and sends it via a communications network to the second subscriber T2. By means of the notification B, the second subscriber T2 is informed that the first subscriber T1 has left a message N for him in the message box of the telecommunications service 10.

According to an embodiment of the invention, the telecommunications service 10 comprises a notification service 11, which is in charge of the generation of the notification to the second subscriber T2 and for the sending of the notification.

All data incurred at the telecommunications service provider 5, i.e., traffic data and user data, is stored in the secured environment U, and is processed, if needed. As explained above, both the user data as well as the traffic data may be stored in the secured environment U encrypted, preferably encrypted twice. By the double encrypting, it is ensured that the telecommunications service provider 5 has no access to the user and traffic data. The encrypting or double encrypting of the data is preferably carried out within the secured environment U, wherein also the keys necessary for this are generated, stored, and managed in the secure environment U. The secure environment U is also referred to as sealed infrastructure and prevents that neither the provider of the infrastructure nor the telecommunications operator or telecommunications service provider 5 may access the data during the processing.

For this, the secured environment U may comprise means for generating the necessary cryptographic keys not shown in FIG. 1. In order to prevent that the connection data or user data encrypted in the secured environment U by the telecommunications service provider 5 may be readily decrypted by the latter by means of the corresponding decryption key, it is preferable to encrypt the encrypted data by a further encryption key again, and to deposit the double-encrypted data in a storage means of the secured environment U. The second encryption key may be handed over to a trustworthy authority, for example, a notary, who may only issue the latter upon judicial order.

The secured environment U or the sealed infrastructure may comprise a number of redundant or distributed computer resources, which respectively may comprise a number of so-called Trusted Platform Modules (TPM), circuit breakers for interruption of the power supply of the entire computer resources, electromagnetic locks, a number of sensors, by means of which the access to the computer resources may be monitored. According to an embodiment of the invention, the computer resources may comprise storage means, by means of which the cryptographic keys may be stored, wherein according to an embodiment of the invention, the cryptographic keys are exclusively stored in volatile storage means such that after an interruption of the power supply, the stored keys are deleted again. The deletion of the cryptographic keys may be necessary, for example, if somebody gains access or admission to the computer resource unauthorized. In order to generate the keys again, it is preferable, if the cryptographic keys are synchronized by a synchronization means with a further storage means for storing cryptographic keys.

The computer resources may be connected to a so-called sealing monitoring means (Sealing Control), which monitors the electromechanical components. In case the sealing monitoring means detects an unauthorized access to a computer resource, it may instruct the immediate synchronization of all keys stored in the computer resource, and after completion of the synchronization, it may interrupt the power supply to the compromised computer resource. Thereby, it is ensured that no encryption keys may be generated from a compromised computer resource any longer.

The computer resources may further be coupled to a so-called cloud control, which may be provided in order to execute the data exchange with one or more subscribers T. The cloud control may be also coupled to the sealing monitoring means, if needed, such that the sealing monitoring means may also initiate corresponding measures upon a detected interference via a communications network.

The subscribers T1 to Tn of the telecommunications network 10 may be smartphones, tablet PCs, common computers, or the like, wherein in the example shown in FIG. 1, a subscriber is respectively assigned to a user. As can be seem from FIG. 1, a data transmission is carried out between the subscribers T1 and T2 and the telecommunications service 10, wherein data is transmitted from the first subscriber T1 to the telecommunications service 10 and data from the telecommunications service 10 to the second subscriber T2, i.e., data from outside of the secured environment U arrive at the telecommunications service 10, or data from the telecommunications service 10 arrive, from the secured environment U, at a second subscriber T2.

Also, if the data transmission between the two subscribers T1, T2, and the telecommunications service 10 is carried out encrypted, the telecommunications service provider 5 obtains the information that the subscribers T1 and T2 are involved in a (common) communication. In order to prevent that the telecommunications service provider obtains the information that the first subscriber T1 communicates with the second subscriber T2 only on the basis of the data traffic (without having to know the content of the sent or received data for this), according to the invention, it is provided for the notification B being generated by the telecommunications service 10 or by the notification service 11, and being sent or transmitted time-delayed to the second subscriber T2. By the time-delayed sending of the notification B, it is achieved that the telecommunications service provider 5 is not able to make, on the basis of the data traffic, any assignment between the received message N and the notification B sent, and, therefore, is not able to deduce from the traffic data, the information that the subscriber T1 has communicated with the subscriber T2. By the provision of the time-delay between the receipt of the message N and the sending of the notification B, this traffic data being accessible from outside of the secured environment is "concealed" such that neither for the telecommunications service provider 5 nor for an unauthorized third party it is recognizable, who has frequently communicated with whom.

According to an embodiment of the invention, also the notification B may be transmitted encrypted or encoded. This is specifically preferable, if the recipient of the message N is to be informed by the confirmation notification B, who has left the message N for him, for example, in a message box, or what kind of content is concerned with respect to the message deposited in the message box.

However, it has been found to be specifically preferable, if only that information is transmitted to the recipient or to the second subscriber T2 by means of the notification B that a message has been deposited for him with the telecommunications service provider 5. If only the information is transmitted by means of the notification B that a message has been deposited, the notification B may be identical for all subscribers of the telecommunications service such that an encryption or an encrypted transmission of the notification B may be omitted. Thereby, the load of the system for the generation and sending of the notifications may be substantially reduced or minimized on the side of the telecommunications service provider.

According to an embodiment of the invention, it is sufficient, if the user data of the notification B only have a length of one bit, because one bit is sufficient for the purpose of signalizing to the second subscriber T2 that any kind of message has been deposited for him with the telecommunications service provider. Thereby, the data volume for the transmission of the notifications B to the subscribers of the telecommunications service may be reduced or minimized.

After receipt of the notification B, the second subscriber T2 may request the message N intended for him from the telecommunications service provider. The communication between the first subscriber T1 and the second subscriber T2, thereby, may be carried out on the basis of an end-to-end encryption, i.e., the first subscriber encrypts the message and the second subscriber decrypts the message N. For encrypting the message, a homomorphic encryption method may be used. Thereby, e.g., the telecommunications service may carry out an operation on the message without having to decrypt the message itself. The result of the operation also is present in encrypted form.

Figure 2:
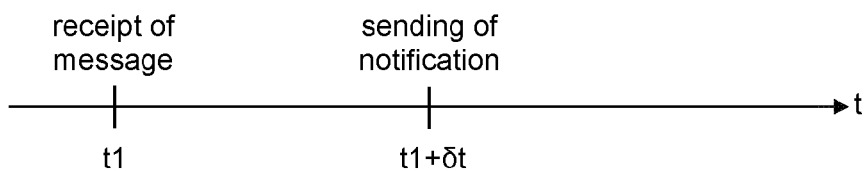
FIG. 2 shows the timing between the receipt of a message and the sending of a notification.

FIG. 2 shows the timing of the receipt of a message and the sending of a notification.

At the time point t1, the telecommunications service of the telecommunications service provider receives a message from a first subscriber. After the receipt of the message, the telecommunications service or the telecommunications service provider generates a notification for the subscriber, for whom the received message is intended, and sends the notification to this subscriber, wherein a predetermined time-delay $\delta t$ is provided between the receipt of the message at the time point t1 and the sending of the notification. I.e., the notification is sent to the second subscriber $t1+\delta t$.

In the simplest case of the invention, a constant time delay $\delta t$ is used for all notifications sent. However, such a constant time delay has the disadvantage that this may possibly be determined by means of an analysis of the data traffic between the subscribers and the telecommunications service such that with knowledge of the time delay $\delta t$, an assignment of a notification B to a received message N will become possible again. In order to prevent this, according to the invention, a dynamical time delay may be provided, which after a certain number of notifications—in the best case, after each notification—changes. Thereby, the determination of a time delay by an analysis of the data traffic, on the one hand, is substantially impeded and, on the other hand, a determined time delay may only be used for some notifications sent in the past, in order to be able to assign the notifications correctly to the respective notifications received, whereas a time delay for such an assignment of notifications to messages for notifications to be sent in the future or received messages thus determined becomes worthless, because the current time delay will already have changed then.

Such dynamics of the time delay $\delta t$ may be achieved, for example, by selecting the time delay $\delta t$ depending on the data traffic per time unit between the subscribers and the telecommunications service.

Figure 3:
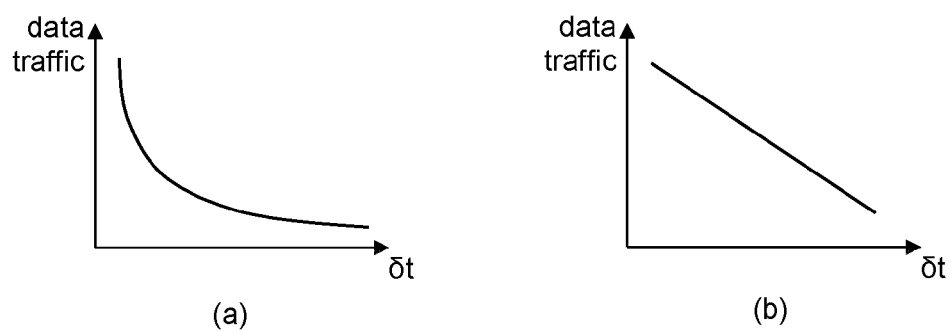
FIG. 3 shows two variants for the selection of a time delay depending on the data traffic according to the invention.

Examples for the selection of a time delay δt depending on the data traffic per time unit are shown in FIG. 3.

In the example shown in FIG. 3, the time delay is smaller at high data traffic per time unit than at lower data traffic per time unit, i.e., upon high data traffic, the lower time delay δt may be selected then with lower data traffic, because higher data traffic usually involves a high number of messages of a high number of subscribers such that already due to a large number of notifications sent, an assignment of a notification sent to a received message is impeded.

In the example shown in FIG. 3a, the time delay δt is not depending on the data traffic in a linear manner, whereas in the example shown in FIG. 3b, the time delay δt depends on the data traffic in a linear manner. Of course, also other dependencies than the ones shown in FIG. 3a and FIG. 3b between the time delay δt and the data traffic may be selected.

According to an embodiment of the invention, the data traffic per time unit may comprise the number of received messages N per time unit.

In order to achieve an even better dynamics of the selected time delay δt, it may be provided for a time delay δt necessary for the sending of a notification is selected from a time delay interval randomly. Hereby, the time delay δt may be selected for a certain number of notifications to be sent from the time delay interval. Alternatively, the time delay δt may be selected for each single notification to be sent randomly from the time delay interval. Thereby, it is achieved that even with a comprehensive analysis of the data traffic between the subscribers and the telecommunications service, no drawbacks as to the assignment of the notifications to the received messages is possible, because, on the one hand, each time delay is subject to a certain randomness, and because, on the other hand, due to the random selection of the time delay for the notifications sent, the sequence of the notifications sent no longer corresponds to the sequence of the messages received.

The random component for the random selection of the time delay from a time delay interval can be even further improved by selecting the interval boundaries of the time delay interval depending on the data traffic per time unit between the subscribers and the telecommunications service. Thereby, it is ensured that small time delays δt are selected randomly from the time delay interval at high data traffic, and at low data traffic, larger time delays δt are selected from the time delay interval.

According to an embodiment of the invention, additionally or alternatively to the measures for the selection of a time delay mentioned above, the generated notifications may be queued in a notification queue randomly such that the sequence of the notifications to be sent no longer corresponds to the sequence of the received messages. With use of such a queue, in which the notifications to be sent are queued randomly, a random selection of a time delay from a time delay interval may be omitted, because due to the random queuing of the notifications in the queue, also with a constant time delay, it is ensured that a notification sent cannot be assigned to a received message correctly.

REFERENCE NUMERALS 5 telecommunications service provider
10 telecommunications service
11 notification service
δt time delay between data receipt and sending of a notification B notification between telecommunications service and subscriber
D data of the notification
N message between subscriber and telecommunications service
T subscriber
T1 first subscriber
T2 second subscriber
U secured environment

What is claimed is:

1. A method for securing telecommunications traffic data incurred by a telecommunications service provider (5) during a use of at least one telecommunications service (10) by a number of subscribers (T), wherein:
the telecommunications service receives a message (N) of a first subscriber (T1) of the telecommunications service, which is intended for a second subscriber (T2) of the telecommunications service, and
the telecommunications service sends a corresponding notification (B) to the second subscriber in response to the receipt of the message (N), wherein between the receipt of the message (N) and the sending of the corresponding notification (B), a time delay (δt) is provided respectively,
wherein the time delay (δt) between the receipt of the message (N) and the sending of the notification (B) is selected depending on the data traffic per time unit between the subscribers (T) and the telecommunications service,
wherein the time delay (δt) is smaller at higher data traffic per time unit than at lower data traffic per time unit.

2. The method of claim 1, wherein the time delay (δt) is selected randomly from a time delay interval.

3. The method of claim 2, wherein the interval boundaries of the time delay interval are selected depending on the data traffic per time unit between the subscribers (T) and the telecommunications service.

4. The method of claim 1, wherein the time delay (δt) is selected respectively different for a predetermined number of messages or for each notification.

5. The method of claim 1, wherein the data traffic per time unit comprises the number of received messages (N) per time unit.

6. The method of claim 1, wherein the telecommunications service (10) comprises a notification service (11), which generates the notification (B) to the at least one second subscriber (T2), and triggers the time-delayed sending of the generated notification, wherein the time delay (δt) is determined by the notification service, and wherein telecommunications service is being executed in a secured environment (U).

7. The method of claim 1, wherein the notification (B) is not sent to the second subscriber (T2), if the second subscriber is not signed in at the telecommunications service (10).

8. The method of claim 1, wherein the notification (B) comprises data (D), which is adapted to output to the second subscriber (T2) an acoustic and/or visual signal, which signalizes the presence of the message (N).

9. The method of claim 1, wherein the notification (B) is identical for each subscriber (T).

10. The method of claim 1, wherein the notification (B) is sent non-encrypted.

11. The method of claim 1, wherein the message (N) is transmitted upon request by the second subscriber (T2) from the telecommunications service (10) to the second subscriber.

12. The method of claim 1, wherein the transmission of the message (N) from the first subscriber (T1) to the second subscriber (T2) is carried out on the basis of an end-to-end encryption, wherein the message is encrypted in a homomorphic manner.

13. A system for securing telecommunications traffic data, which is incurred by a telecommunications service provider (5) of a telecommunications service during use of at least one telecommunications service (10) by a number of subscribers (T), wherein the telecommunications service is adapted to:
   receive from a first subscriber (T1) a message (N), which is intended for a second subscriber (T2), and
   send a notification (B) in response to the receipt of the message (N) to the second subscriber (T2), wherein between the receipt of the message and the sending of the notification, a certain time delay ($\delta t$) is provided,
   wherein the telecommunications service is adapted to select the time delay ($\delta t$) between the receipt of the message (N) and the sending of the notification (B) depending on the data traffic per time unit between the subscribers (T) and the telecommunications service,
   wherein the time delay ($\delta t$) is smaller at higher data traffic per time unit than at lower data traffic per time unit.

14. The system of claim 13, wherein the telecommunications service (10) comprises a notification service (11), which is adapted to generate the notification (B) to the at least one second subscriber (T2), and to trigger the time-delayed sending of the generated notification, wherein the time delay ($\delta t$) is determined by the notification service, and wherein the system comprises a secured environment, in which the telecommunications service is executable.

* * * * *